3,025,459
CONDUCTIVITY CELLS
Edgar L. Eckfeldt, Ambler, and Eugene R. Kuczynski, Philadelphia, Pa., assignors to Leeds and Northrup Company, Philadelphia, Pa., a corporation of Pennsylvania
Filed Apr. 7, 1959, Ser. No. 804,767
3 Claims. (Cl. 324—30)

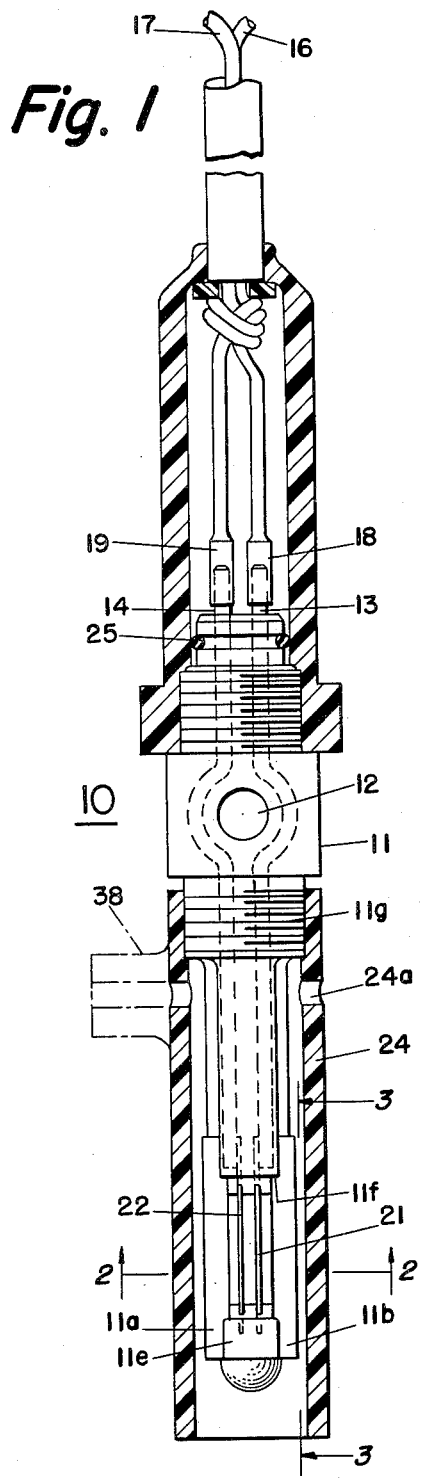
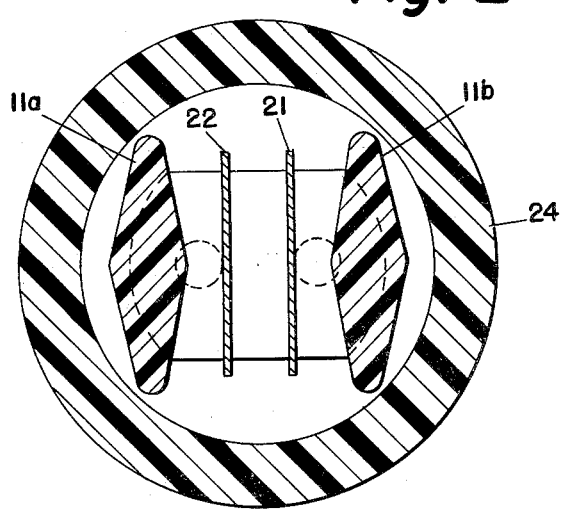
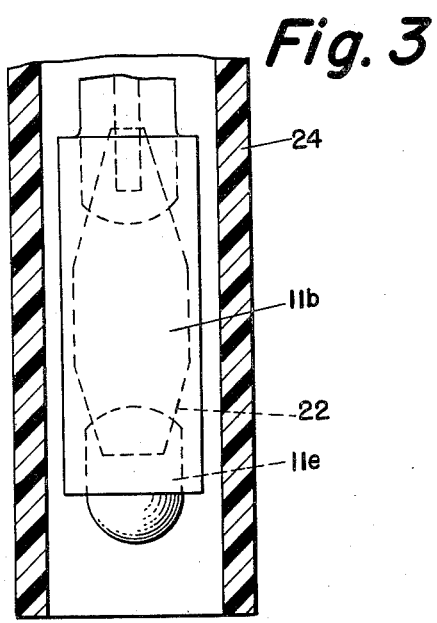

This invention relates to conductivity cells and has for an object the provision of structure for making the cells reliable in operation with a predetermined cell constant, such cells being useful for reproducible determination of the conductivity of liquids of widely differing character.

The present application is a continuation-in-part of our application Serial No. 569,066, filed March 2, 1956, now United States Patent No. 2,888,640. In our said parent application we disclosed a conductivity cell comprising a molded body with a pair of conductors embedded in the body. The conductors extend outwardly from one end of the molded body to provide for electrical connection from the electrodes to be in contact with the liquid to the measuring circuit. The conductivity cells of our aforesaid application had cell constants of 25 reciprocal centimeters and 50 reciprocal centimeters. While other and different cell constants may be obtained in accordance with the design of our said parent application by suitably changing the diameter and length of the flow passages, there arise additional considerations disadvantageous when dimensions alone are changed in our aforesaid cell, particularly when the cell constant is to be reduced to a much lower order, for example to one reciprocal centimeter. Nevertheless, the associated measuring equipment and the associated piping needed for flow of liquid through the cell will be substantially the same for conductivity cells of widely differing cell constants, as for example, from 0.002 reciprocal centimeter to 50 reciprocal centimeters. Accordingly, it is highly advantageous that the conductivity cell of the present invention, insofar as the electrical circuits and attachment to other structural members be concerned, be interchangeable with conductivity cells having other and different cell constants.

In carrying out the present invention in one form thereof, the two electrodes of the cell comprise elongated plates, the opposite ends of which are embedded in a body of plastic insulating material. The plates extend parallel to the longitudinal center line of the supporting body and are disposed between parallel walls of that body, the inner surfaces of which are spaced from the electrodes by amounts approximately equal to the spacing between the plates. To the upper ends of each plate, there is electrically secured, as by soldering or welding, a conductor. The two conductors are embedded in the plastic body and have their upper or opposite ends exposed for completion of electrical connections to a measuring circuit.

For further objects and advantages of the invention, reference is to be had to the following detailed description taken in conjunction with the accompanying drawing in which:

FIG. 1 is a sectional view of the conductivity cell embodying the invention;

FIG. 2 is an enlarged sectional view taken on the line 2—2 of FIG. 1; and

FIG. 3 is an enlarged fractional elevation illustrating the shape of the electrode plates.

Referring to FIG. 1, a conductivity cell 10 comprises a molded body 11 having a transverse passage 12 extending through the upper end thereof. A pair of electical conductors 13 and 14 protrude above the upper end of the body 11 to form pin-connectors for the measuring circuit to be used in conjunction with the cell 10. The circuit from the measuring instrument extends by way of conductors 16 and 17, these being connected to the ends of conductors 13 and 14 by means of clips 18 and 19.

In order to achieve a cell constant of 0.1 reciprocal centimeter, there are utilized plate-like electrodes 21 and 22 disposed in opposition, that is, in spaced face-to-face relation, one to the other and parallel to the longitudinal axis of the molded body 11. The lower ends of the electrodes 21 and 22 are embedded in the lower end of the molded body 11. Similarly, the upper ends of the electrodes are embedded within the mid-portion of the molded body and in regions in proximity to the lower ends of conductors 13 and 14. Each electrode is electrically connected to its adjacent conductors, as by soldering or brazing. In the region adjacent the exposed areas of electrodes 21 and 22 are side wall structures 11a and 11b of molded body 11. These side wall structures generally lie in planes parallel to the electrodes 21 and 22 but instead of having plane surfaces, the side wall portions 11a and 11b are preferably tapered from their central portions toward their outer edges. These side wall portions not only provide rugged and rigid support for the lower end of the molded body, but they also protect the electrodes and predetermine the quantity of liquid present in the regions adjacent the outer faces of the two electrodes. It will be noted from FIG. 3 that the electrodes have tapered end portions to reduce the width in the regions where they enter the molded body 11. Thus, the intermediate portions of each electrode are of greater dimension than end portions embedded in body 11. The side walls 11a and 11b are at least as wide as the widest dimension of these electrodes.

The spacing between the lower end 11e of body 11 and the opposing end 11f is 0.704 inch. The electrodes 21 and 22 have a maximum width of 0.45 inch. These electrodes have an exposed area of 0.313 square inch on one face.

A protective tube 24 having an inside diameter approximately the same as the maximum distance across the side walls 11a and 11b has a threaded upper end which is threaded onto a threaded hub portion 11g of molded body 11. The protective cover 24 is provided with flow channels 24a at its upper end for circulation of liquid through the cell.

The body 11 and the protective cover 24 are preferably made of a dimensionally stable, chemically inert, electrical insulating material, as from one of the synthetic resins. It has been found that either trifluorochloroethylene, available on the market under the tradename "Kel–F," or a "Teflon" resin, is suitable since they both lend themselves to the molding or forming operations by means of which the conductors 13 and 14 are embedded in the body 11 together with the end portions of electrodes 21 and 22. In this connection, the conductors 13 and 14 may be of suitable electrical conducting material, of substantial cross-sectional area, such as silver plated copper, or of other low cost material inert to the molding resin. The conductors 13 and 14, since embedded within body 11, are protected from the fluids with which the cell is utilized. These conductors 13 and 14 extend lengthwise of, and so impart additional strength to, the molded body. As explained in our parent application, in the region adjacent the transverse passage 12, they are formed in semi-circular opposed relation. The electrodes themselves are preferably of a material inert to the solutions with which the cell is to be used. They will ordinarily be made of a platinum-coated material. They may also be made of platinum, preferably coated with platinum black to improve their performance.

It is to be noted that there is shown by broken lines an extension 38 which may be threaded to receive a pipe connection for forced flow of liquid through the cell, it being understood the opening 24a would then be omitted. In this connection, the lower end of the housing 24 may likewise be threaded to receive a length of pipe to complete the inclusion of the cell 10 in a fluid-circulating system, the conductivity of which fluid is to be measured. In practice, the housing 24 is made interchangeable with a flow-providing housing including the branch projection 38, an example of such a housing being shown in our companion application Serial No. 804,765, executed and filed concurrently herewith.

What is claimed is:

1. A conductivity cell comprising an elongated body having near its lower end a pair of spaced side walls, a pair of plate-like electrodes spaced from each other and from said side walls and disposed between said side walls, the opposite ends of said electrodes being embedded in said body, said electrodes having end portions narrower than their mid-portions, said mid-portions being wider than the width of said body in the regions in which said narrowed end portions are embedded therein, and said body having extending through the interior thereof a pair of conductors respectively connected at their ends to said electrodes, said conductors being exposed at the opposite end of said body for connection thereto of an electrical measuring circuit.

2. The conductivity cell of claim 1 in which said side walls are tapered from their respective central portions toward their outer edges to provide a cross-sectional area, for the fluid between their inner faces and the adjacent electrodes, which increases from the central portion thereof to the outer edges thereof.

3. A conductivity cell comprising an elongated body having near its lower end a pair of spaced side walls, a pair of plate-like electrodes spaced from each other and from said side walls and disposed between said side walls, the opposite ends of said electrodes being embedded in said body, said body having extending through the interior thereof a pair of conductors respectively connected at their ends to said electrodes, said conductors being exposed at the opposite end of said body for connection thereto of an electrical measuring circuit, and said side walls being tapered from their respective central portions toward their outer edges to provide a cross-sectional area, for the fluid between their inner faces and the adjacent electrodes, which increases from the central portion thereof to the outer edges thereof.

References Cited in the file of this patent

UNITED STATES PATENTS

| | | |
|---|---|---|
| 1,518,211 | Maue | Dec. 9, 1924 |
| 1,865,847 | Ennis | July 5, 1932 |
| 2,769,140 | Obenshain | Oct. 30, 1956 |

FOREIGN PATENTS

| | | |
|---|---|---|
| 300,229 | Great Britain | Nov. 9, 1928 |